July 31, 1923.  
W. J. DOUGLAS  
EXTENSION FILLER PIPE  
Filed Aug. 24, 1921  
1,463,202
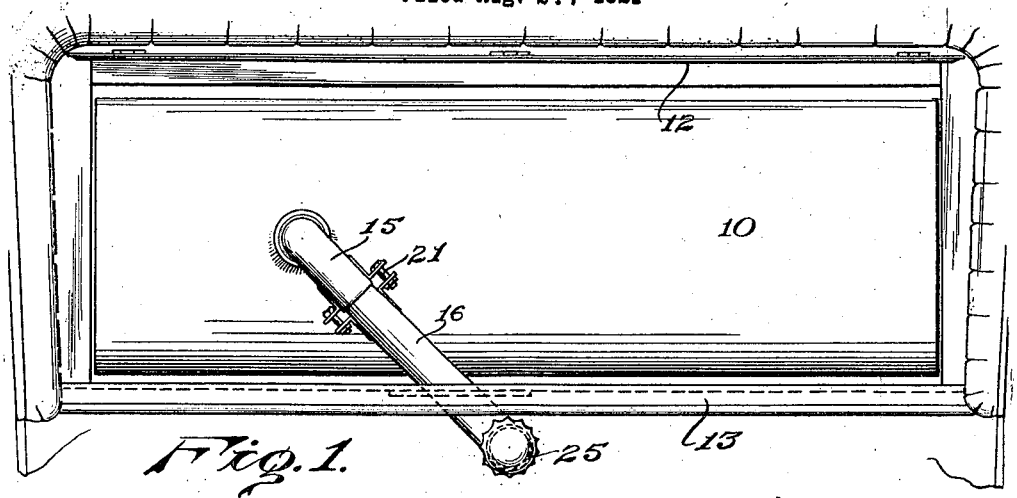
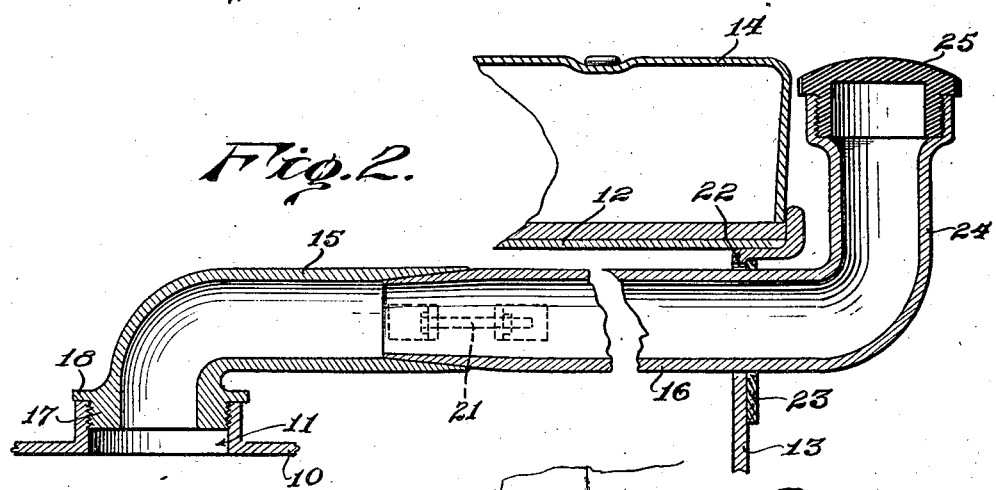
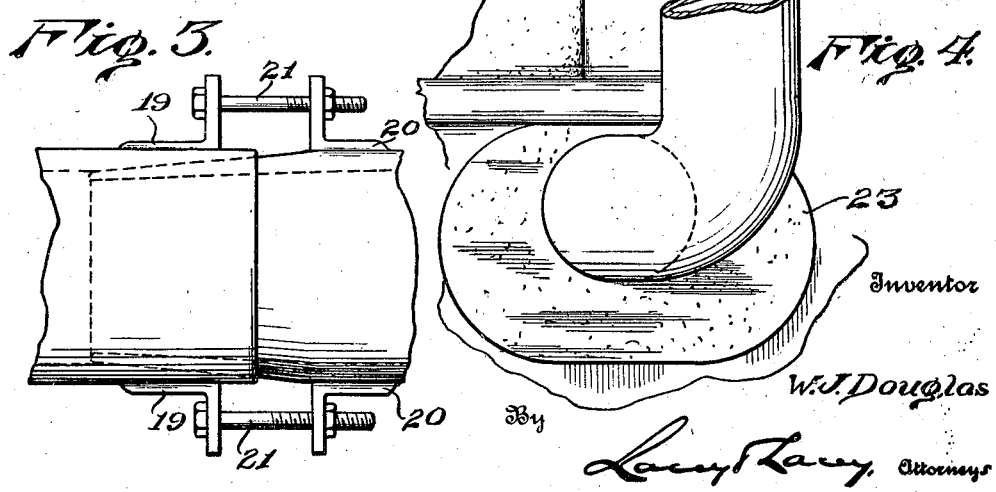
Inventor  
W. J. Douglas  
By Lacey & Lacey, Attorneys Patented July 31, 1923.

UNITED STATES PATENT OFFICE.

WILLIAM J. DOUGLAS, OF NUMA, IOWA.

EXTENSION FILLER PIPE.

Application filed August 24, 1921. Serial No. 494,990.

*To all whom it may concern:*

Be it known that I, WILLIAM J. DOUGLAS, citizen of the United States, residing at Numa, in the county of Appanoose and State of Iowa, have invented certain new and useful Improvements in Extension Filler Pipes, of which the following is a specification.

This invention relates to an improved extension filler pipe for motor vehicle fuel tanks and seeks among other objects to provide an attachment which will eliminate the inconvenience and trouble now experienced in filling the inaccessible fuel tanks of different makes of motor vehicles.

The invention has as a further object to provide an attachment of the character indicated particularly adapted for use in connection with Ford vehicles and which will render it unnecessary to lift the front seat of such a vehicle in order to fill the fuel tank of the vehicle.

And the invention has as a still further object to provide a device which will be characterized by structural simplicity and which may be readily applied.

Other and incidental objects will appear hereinafter.

In the drawing:

Figure 1 is a plan view showing my improved device in connection with the fuel tank of a Ford vehicle.

Figure 2 is an enlarged sectional view more particularly bringing out the mounting of the device.

Figure 3 is a detail plan view showing the connection between the sections of the pipe, and Figure 4 is a fragmentary elevation particularly showing the collar employed in conjunction with the pipe.

As previously intimated, the present invention is particularly adapted for use in connection with Ford vehicles and I have so shown the invention and will describe the device accordingly. However, it is to be understood that I do not wish to be limited in this regard since the invention will prove efficient when used in connection with other makes of vehicles, if found applicable. The fuel tank of a Ford vehicle is indicated in the drawing at 10 and, as usual, this tank is provided near one end with a filling opening 11. As is well known, the tank is mounted beneath the front seat of the vehicle and normally overlying the tank is a hinged cover 12, the free outer longitudinal margin of which rests against the counter 13 of the seat. The seat cushion, indicated at 14, rests upon the cover 11. Thus, as will be seen, in order to fill the tank, it is necessary to remove the cushion 14 and, in most instances, lift the cover 12 in order that access may be had to the filling opening 11 of the tank. The present invention, therefore, seeks to overcome this inconvenience by providing a means whereby the tank may be filled while the seat cushion is in place.

In carrying the invention into effect, my improved filler pipe is formed of mating sections 15 and 16 respectively. The section 15 is provided at its inner end with an elbow terminating in a head 17 which is threaded into the filling opening 11 of the tank and formed on said head is an annular stop flange 18 to provide a closed joint between the pipe section and the tank. Since, in applying the device, it will be necessary to turn the pipe section 15 in order to thread the head thereof into the opening 11, said section is made relatively short so that said section may be rotated without striking the seat counter or other adjacent parts of the vehicle. At its outer end, the section 15 is formed with an internal beveled seat and, as particularly shown in Figure 2, the inner end of the section 16 is tapered to snugly fit into the former section tightly engaging said seat to provide a closed joint between the sections. Suitably secured to opposite sides of the section 15 near its outer end are angle plates 19 and similarly mounted upon the section 16 near its inner end are angle plates 20. Extending freely through these plates are clamping bolts 21, the nuts of which may be adjusted for tightly drawing the ends of the pipe sections together. The pipe section 16 is arranged to removably extend through an opening 22 in the counter 13 of the seat and surrounding said section to overlie the counter closing said opening is a collar 23. Since it will be necessary to fit this collar either over one end or the other of the pipe section, the collar is of elastic material and when applied, will snugly grip the pipe section. At its outer end, the pipe section 16 is formed with an upstanding elbow 24 terminating at approximately the level of the seat cushion 14 and threaded into the pipe section at its upper end is a removable closure plug 25.

As will now be readily understood in view of the preceding description, by removing the plug 25 of the extension pipe the fuel tank 10 may be readily filled, thus doing away with the necessity for removing the seat cushion 14 to accomplish the filling operation. Furthermore, the device may be readily applied and, in use, will prove a highly convenient attachment.

Having thus described the invention, what is claimed as new is:

The combination with a vehicle seat having a counter, and a fuel tank located beneath the seat and provided with a customary filling opening accessible when the seat is removed for filling the tank, of an accessory extension filler pipe connected to the tank without structural change therein and including a sectional tube comprising a short section having a terminal head threaded into said filling opening and another longer section extending through the counter mating with said first mentioned section whereby the tank may be filled through said tube without displacing the seat, and means detachably connecting said sections, said first mentioned section terminating short of the counter whereby the longer section may be disconnected from the shorter section and the shorter section individually rotated for connecting such section with the tank.

In testimony whereof I affix my signature.

WILLIAM J. DOUGLAS. [L. S.]